United States Patent [19]

Takahashi

[11] Patent Number: 4,715,095

[45] Date of Patent: Dec. 29, 1987

[54] PLATE FASTENER

[75] Inventor: Norio Takahashi, Yokohama, Japan

[73] Assignee: Nifco Inc., Yokohama, Japan

[21] Appl. No.: 946,977

[22] Filed: Dec. 29, 1986

[30] Foreign Application Priority Data

Jan. 22, 1986 [JP] Japan .................................. 61-10252

[51] Int. Cl.[4] .......................................... F16B 21/08
[52] U.S. Cl. .................................... 24/453; 24/297;
411/508
[58] Field of Search ................ 24/453, 297, 573, 587,
24/563; 411/508, 510

[56] References Cited

U.S. PATENT DOCUMENTS

| 3,181,411 | 5/1965 | Mejlso | 411/508 |
|---|---|---|---|
| 3,230,592 | 1/1966 | Hosea | 24/297 |
| 3,249,973 | 5/1966 | Seckerson | 24/297 |
| 3,577,603 | 5/1971 | Seckerson | 411/510 |

FOREIGN PATENT DOCUMENTS

| 271725 | 4/1964 | Australia | 24/297 |
|---|---|---|---|
| 284961 | 6/1965 | Australia | 24/297 |
| 1360474 | 3/1964 | France | 411/508 |
| 5631444 | 4/1981 | Japan | 411/508 |
| 882898 | 11/1961 | United Kingdom | 24/297 |
| 1444846 | 8/1976 | United Kingdom | 24/297 |

Primary Examiner—Victor N. Sakran
Attorney, Agent, or Firm—Trexler, Bushnell, Giangiorgi & Blackstone, Ltd.

[57] ABSTRACT

A plate fastener made of a synthetic resin for fastening together two plates in a face-to-face relation comprises a head portion to be locked in an engagement hole formed on one of the two plates, a cylindrical leg portion perpendicularly extending from the bottom of the head portion and to be locked in a mounting hole formed in the other one of the plates, and an umbrella-like elastic engagement portion extending from the outer periphery of a stem portion of the leg portion and to be in close area contact with the other plate, the leg portion having a projection formed on the outer periphery to engage with the edge of a mounting hole formed in the other plate in a face-to-face relation to the engagement portion and a reduced-thickness axial hinge portion formed in the wall portion other than the projection, the wall of the leg portion being flexed in the folding fashion about the hinge portion.

7 Claims, 8 Drawing Figures

PLATE FASTENER

FIELD OF THE INVENTION AND RELATED ART STATEMENT

This invention relates to a plate fastener made of a synthetic resin, which is used for fastening together two plates members in a face-to-face spaced-apart relation or in contact with each other, e.g., for fastening an automobile interior board (trim board) to the automobile body.

Heretofore, various fasteners for fastening together two plates have been proposed, and there are many examples of use of these fasteners for fastening auotmobile parts and assembling electric apparatuses such as household electric units as well as fastening parts of these apparatuses.

This invention aims to provide a plate fastener, which features a leg portion to be engaged in a mounting hole formed in a stationary plate member.

While many plate fasteners of such type have been proposed, unfastening the plates by withdrawing the leg portion from the mounting hole of the stationary plate is not so easy compared to the insertion of the leg portion.

Particularly, where a synthetic resin fastener is inserted into a hole formed in a metal plate member such as an automobile body, it is sometimes necessary to break the leg portion, depending on the structure thereof, to remove the fastener. Even when the fastener can be removed without breaking it, engagement pawl of the leg portion may be broken off by the edge of the hole so that the removed fastener can no longer be used.

In view of the above problems, there has been proposed a method of fastening plates together, which uses a fastener consisting of two, i.e., male and female, members, and which comprises the steps of preliminarily securing the male and female members to the plates to be fastened together and then coupling together the male and female members to thereby effect fastening of the plates.

An example of such fastener is disclosed in Japanese Patent Publication No. 56-31444. The disclosed fastener, while it can effect the fastening of plates with the coupling of male and female members, permits separation of the two members by pulling out the male member if it becomes necessary to unfasten the plates.

This fastener has features that the fastened plates can be unfastened by separating the male and female members by pulling out the male member, that the male member can be pulled out smoothly and without possibility of breaking of engagement pawl by the edge of a mounting hole formed in the plate so that it can be used again, and that the male and female members can be coupled together by a click engagement so that it can be sensed by the user that the two members are coupled together.

Although the above proposed fastener has various advantages, it consists of two members, thus leading to a high cost of manufacture. In addition, the two members are preliminarily secured to the plates to be fastened together. Therefore, the operability of fastening is rather inferior.

A fastener having an anchor-shaped leg portion, for instance, is a one-piece product and can be manufactured at a low cost. However, this fastener has a fatal drawback in that the leg portion has to be broken when removing it. In addition, no click engagement is obtained when the leg portion is inserted.

OBJECT AND SUMMARY OF THE INVENTION

An object of the invention is to provide a fastener which consists of a one-piece member and has superior manufacture control property.

Another object of the invention is to provide a fastener which can be readily pulled out from a plate to unfasten plates and be used again after the removal.

A further object of the invention is to provide a fastener, which can be engaged in a mounting hole formed in a plate by a click engagement when it is inserted through the hole so that the operator can confirm that it is engaged.

To attain the above and other objects of the invention, there is provided a plate fastener made of a synthetic resin for fastening together two plates in a face-to-face relation to each other, which comprises a head portion to be locked in an engagement hole formed on one of the two plates, a cylindrical leg portion perpendicularly extending from the bottom of the head portion and to be locked in a mounting hole formed in the other one of the plates, and an umbrella-like elastic engagement portion extending from the outer periphery of a stem portion of the leg portion and to be in close area contact with the other plate, the leg portion having a projection formed on the outer periphery to engage with the edge of a mounting hole formed in the other plate in a face-to-face relation to the engagement portion and a reduced-thickness axial hinge portion formed in a wall portion other than the projection, the wall of the leg portion being flexed in folding fashion about the hinge portion.

A particular feature of the fastener according to the invention over the prior art fastener resides in that the cylindrical leg portion is formed with hinge portions by forming axial hinge portions by forming axial grooves. When the leg portion is inserted through the mounting hole, part of its peripheral wall is inwardly flexed about the hinge portions, whereby the substantial outer diameter of the leg portion is reduced to improve the ease with which the projections on the outer periphery of the leg portion pass through the mounting hole. Also, the ease with which the leg portion is pulled out is improved, and the fastener can be removed without breaking the projections. Further, at the completion of the insertion, a click engagement is produced with the restoration of the folded wall portion of the leg portion, thus permitting the operator to confirm that the leg portion has been engaged.

To use the fastener having the above construction according to the invention, the head portion is first engaged and mounted in the engagement hole formed in one of the plates to be fastened together, so that the leg portion projects perpendicularly from one plate surface. Then, the other plate is brought to be in a face-to-face relation to the plate with the fastener, and the leg portion is forcibly inserted through the mounting hole formed in the other plate, thus fastening together the plates. As the leg portion is inserted through the mounting hole, part of its peripheral wall is inwardly folded about the reduced-thickness axial hinge portions to substantially reduce the outer diameter of the leg portion, thus permitting passage of the projections through the hole. In this way, the fastener can be readily locked in the mounting hole. In addition, when the projections clear the mounting hole, the radially contracted leg portion restores to the initial state with the restoring force of the material, and at this time a click engagement can be obtained. To unfasten the hinge portions, part of the peripheral wall of the leg portion is inwardly folded about the hinge portions to facilitate the passage of the projections through the mounting hole and thus permit removal of the fastener.

The above and other objects and features of the invention will become more apparent from the following detailed description with reference to the accompanying drawings.

DETAILED DESCRIPTION OF THE PREFERRED EMBODIMENT

Figure 1:
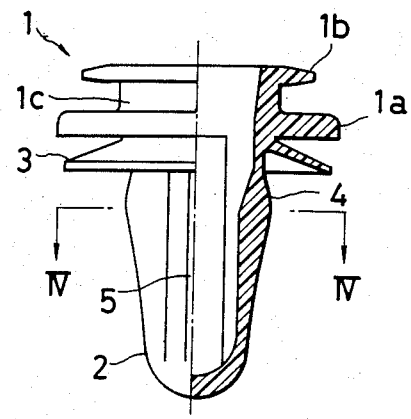
FIG. 1 is a front view in one half and an axially sectional view in the other half showing an embodiment of the fastener according to the invention.
Figure 2:
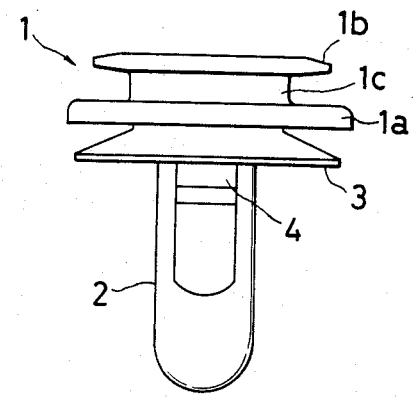
FIG. 2 is a side view showing the fastener shown in FIG. 1.
Figure 3:
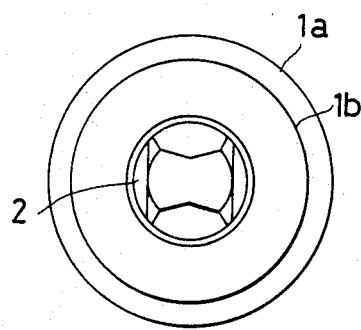
FIG. 3 is a plan view showing the fastener shown in FIG. 1.

The drawings illustrate an embodiment of the fastener according to the invention. The fastener as illustrating is a one-piece member made of a synthetic resin having thermoplasticity, e.g., polypyrene, having adequate elasticity and rigidity. It has a head portion 1, which is secured to one of two plates, i.e., plate A, a leg portion 2 to be secured to the other plate B and an elastic engagement portion 3 for restricting the extent of insertion of the leg portion and ensuring its close contact with one plate.

The head portion 1, in this embodiment, has a large flange-like portion 1a, a small flange-like portion 1b positioned thereabove and a boss-like portion 1c connecting the portions 1a and 1b in a spaced-apart relation to each other. The upper flange-like portion 1b is made thinner along the edge to facilitate insertion into a hole a formed in the plate A.

Figure 7:
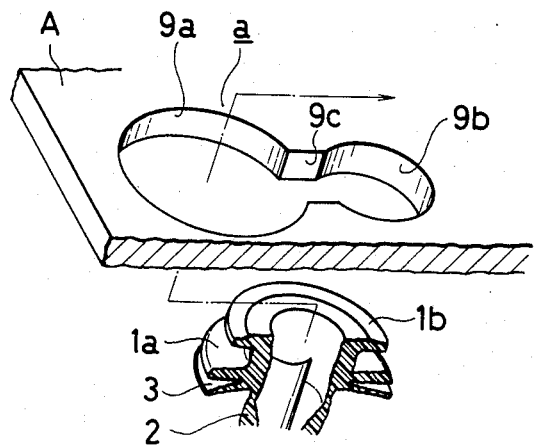
FIG. 7 is a view for explaining an example of an engagement hole formed in a panel to be fastener by the fastener according to the invention.

The hole a formed in the plate A, as shown in FIG. 7, has a key-like shape consisting of a large-diameter circular hole section 9a, a small-diameter circular hole section 9b and a connecting section 9c connecting the two sections. The large-diameter section 9a has a diameter which is smaller than that of the flange-like portion 1a and greater than that of the flange-like portion 1b. The small-diameter section 9b has a diameter smaller than that of the flange-like portion 1b. The connecting section 9c has a width large enough for passage of the boss-like portion 1c along it. To secure the fastener to the plate A, first the small-diameter flange-like portion 1b is inserted through a large-diameter hole section 9a until the large flange-like portion 1b comes into engagement with one surface of the plate. Then the fastener is moved along the connecting section 9c to bring the boss-like portion 1c to the small-diameter section 9b and also bring the small-diameter flange-like portion 1b into engagement with the other surface of the plate. In this way, the fastener is mounted in the mounting hole a.

The leg portion 2 extends perpendicularly from a central portion of the bottom of the head portion. It is hollow and defines a space having an upper end open at the center of the head portion.

The leg portion is basically a hollow cylindrical member. In this embodiment, however, it is cap-like, that is, its inner space is closed at its lower end and is open at the upper end.

The outer periphery of the leg portion 2 has an axially intermediate portion formed with two diametrically spaced-apart projections. The outer periphery is also formed, in portions other than the projections, with axial grooves 5 having a V-shaped sectional profile and extending substantially over the engine length, thus defining hinge portions 6 having a reduced wall thickness. Further, the inner wall surface of the leg portion is formed with axial grooves on opposite sides of each groove 5, thus defining second hinge portions 7 of a reduced wall thickness, i.e., defining a regular-thickness wall portion 8 between each hinge portion 7 and hinge portion 6. The regular-thickness wall portions 8 are foldable about the hinge portions 6 and 7 to reduce the substantial outer diameter of the leg portion.

Figure 4:
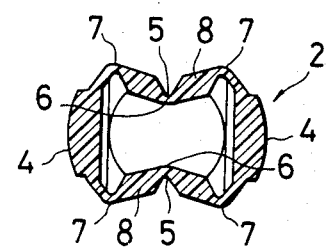
FIG. 4 is a sectional view taken along the line IV—IV in FIG. 1.
Figure 5:
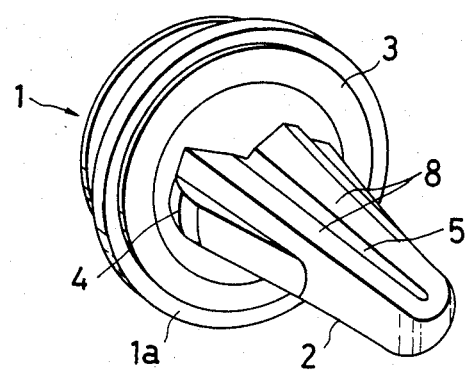
FIG. 5 is a perspective view, taken obliquely upwardly, showing the fastener shown in FIG. 1.
Figure 8:
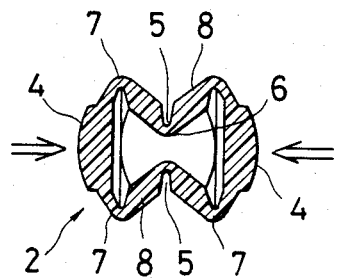
FIG. 8 is a sectional veiw showing the fastener of FIG. 1 with a leg portion in a contracted state.

In this embodiment, the two wall portions of the leg portion connecting the diametrically opposed projections 4 are axially symmetrical (see FIG. 4) with hinges 6 formed in their outer surface and second hinges 7 formed in their inner surface (see FIG. 4). When forces are applied to the outer surfaces of the two wall portions noted above, therefore, the regular-thickness wall portions 8 are folded inwardly about the hinges 6 and 7 into the leg portion to bring the wall portions with the projections 4 closer to each other, thus effecting the reduction of the outer diameter of the leg portion (see FIG. 8).

Meanwhile, the elastic engagement portion 3 extends from the outer periphery of a stem portion of the leg portion 2 right under the head portion 1. In this embodiment, it is like an umbrella which is spread obliquely downwardly.

In the use of the fastener according to the invention, the head portion 1 is inserted through and mounted in an engagement hole a formed in the plate A so that the leg portion 2 projects from one surface of the plate A. Then, the plate A is brought to be in a face-to-face relation to the other plate B, and the leg portion 2 is forcibly inserted through a mounting hole b formed in the plate B, thus fastening together the plates.

As the leg portion 2 is inserted through the mounting hole b, the projections 4 which project to an extent greater than the diameter of the mounting hole b strike the edge of the hole and encounter a resistance. As the leg portion 2 is further inserted against this resistance, its wall portions with the projections 4 are displaced inwardly, so that these wall portions, i.e., the regular-thickness wall portions 8 in this embodiment, are folded inwardly about the reduced-thickness hinge portions 6 and 7 to assist the inward displacement of the wall portions with the projections 4. The outer diameter of the leg portion 2 thus is reduced in effect to promote the passage of the projections 4 through the hole. In this way, the leg portion can be readily inserted, and when the projections clear the mounting hole, the flexed hinge portions 6 and 7 tend to restore the initial state due to the restoring force of the material so as to bring the projections 4 to the initial spaced-apart relation, thus effecting the lock of the fastener in the mounting hole. At the time of restoration of the hinge portions 6 and 7, the leg portion, i.e., the folded regular-thickness wall portions, is click engaged by its elastic force and also by the restoring force of the bottom of the head portion 1.

Figure 6:
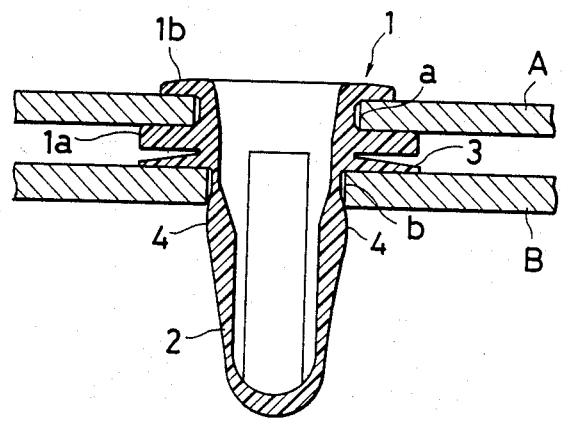
FIG. 6 is a sectional view showing the fastener of FIG. 1 in use.

FIG. 6 is an axial sectional view showing the fastener after the two plates have been fastened together by the procedure described above. The umbrella-like elastic engagement portion 3 which is provided at the stem of the leg portion 2 is held in close contact with one surface of the plate B in a spread state, thus closing the gap of the mounting hole and also clamping the plate B in co-operation with the projections 4. The plate B thus is firmly fastened. Further, with the insertion of the leg portion the engagement portion 3 is spread so as to become taut and raise the folded regular-thickness wall portions 8 and outwardly pull the hinge portions 6, thus promoting the click engagement, preventing the flexing of the leg portion after the mounting thereof and maintaining the locked state of the projections 4.

When the fastener fastening together the plates is pulled out of the mounting hole b so as to separate the plate A, the regular-thickness wall portions on opposite sides of the hinge portions 6 are inwardly folded again about the hinge portions. The portion 2 thus is substantially reduced in outer diameter, and the projections 4 are inwardly displaced. In this way, the fastener can be removed without breaking the leg portion.

Of course, the fastener can be removed without causing damage to the projections 4 owing to the radial contraction of the leg portion. Further, after the removal the leg portion is restored, and the locking function is restored so that the fastener can be used again.

In the above embodiment, a hinge portion 6 is provided in each of the wall portions of the leg portion connecting the wall portions with the projections 4. However, it is possible to omit one of these hinge portions 6. Further, it is possible to omit one of the projections 4 instead of providing the hinge portions 6. Further, it is possible to provide additional projections together with corresponding additional hinge portions 6.

It is to be understood that the hinge portions according to the invention serve as means for causing radial contraction of the hollow leg portion 2 when the leg portion is inserted through the mounting hole. Therefore, the hinge portions may be provided in any number. Also, the projections 4 may be provided in any number so long as they are provided on wall portions other than the portions with the hinge portions.

In the illustrated embodiment, the projections 4 have a gently inclined surface on the upper side and as well as on the side of the free end of the leg portion in consideration of the pulling-out of the leg portion. With this arrangement, it is possible to effectively prevent damage to the leg portion at the time of the removal.

Further, in the above embodiment the engagement hole a in the plate A has a shape like a key hole, while the head has the two flange-like portions 1a and 1b. However, it is possible for the fastener to have an anchor-like head portion to be forcibly inserted and locked in a circular hole formed in a plate, or for the fastener to have any other suitable head portion.

As has been described in the foregoing, with the insertion of the leg portion of the fastener according to the invention through the mounting hole some wall portions of the leg portion are inwardly folded about hinge portions to promote the substantial outer diameter reduction in addition to the radial contraction due to the elasticity of the material. This improves the ease of insertion of the projections through the mounting hole, so that the plates can be readily fastened together. Further, at the time of completion of the insertion, the folded hinge portions are unfolded by the restoring force of the material, so that a click engagement can be obtained. The user can thus confirm that the fastener has been engaged, and this promotes speedy fastening operation.

Further, when the inserted leg portion is pulled out, its wall portions are again radially contracted about the hinge portions to assist the passage of the projections through the mounting hole so that the fastener can be smoothly taken out from the mounting hole of the plate without possibility of damage to the fastener by the edge of the hole.

Particularly, the radial contraction of the leg portion about the hinge portions is effected by the inwardly urging forces acting on the projections 4. The leg portion thus can be contracted smoothly, and there is no possibility for the projections wedging into and being broken off by the edge of the hole. The removed fastener thus can be used again. Further, since the fastener according to the invention is a one-piece product, it can be readily molded and inexpensively manufactured. Further, it is advantageous in view of product control compared to the prior art fastener consisting of two, i.e., male and female, members as noted before. Of course, since the leg portion according to the invention is cylindrical, it is very rigid and less liable to be broken by any shearing force that may be exerted due to a possible sidewise displacement of plates. Further, a water-sealing effect can be expected owing to the cap-like shape of the leg portion and the close contact of the elastic engagement portion with the plate surface. Further, effective utility of the fastener according to the invention can be obtained in use as a fastener for an automobile trim board.

Obviously, many variations and modifications of the present invention can be made in the light of the above teachings. It is therefore to be understood that within the scope of the appended claims, the present invention may be practiced otherwise than as specifically described herein.

What is claimed is:

1. A single piece plate fastener made of a synthetic resin for fastening together two plates in a face-to-face relation to each other, comprising a head portion to be locked in an engagement hole formed in one of said two plates, said head portion comprising upper and lower flange-like portions and a boss-like portion connecting the upper and lower flange-like portions, a cylindrical leg portion integral with and perpendicularly extending from the bottom of said head portion and to be locked in a mounting hole formed in the other one of said plates, and an umbrella-like elastic engagement portion extending from the outer periphery of a stem portion of said leg portion and to be in close area contact with said other plate, said leg portion having a projection formed on the outer periphery to engage with the edge of a mounting hole formed in said other plate in a face-to-face relation to said engagement portion and a reduced-thickness axial hinge portion formed in a wall portion other than said projection, the wall of said leg portion being flexed in folding fashion about said hinge portion.

2. The plate fastener according to claim 1, wherein said head portion consisting of two flange-like portion and a boss-like portion is such that the diameters of the upper and lower flange-like portions are respectively smaller and greater than the diameter of the engagement hole formed in said one plate.

3. The plate fastener according to claim 1, wherein said leg portion has a plurality of said reduced-thickness hinge portions circumferentially spaced apart.

4. The plate fastener according to claim 3, wherein said leg portion has a reduced-thickness hinge portion formed by an axial groove in the outer periphery.

5. The plate fastener according to claim 1, wherein said leg portion has a cap-like form with a closed free end.

6. The plate fastener according to claim 1, wherein said wall has a closed circumference without radial opening and said hinge portion is partially defined by an axial groove formed in the outer periphery of said wall.

7. A plate fastener made of a synthetic resin for fastening together two plates in a face-to-face relation to each other, comprising a head portion to be locked in an engagement hole formed in one of said two plates, a cylindrical leg portion perpendicularly extending from the bottom of said head portion and to be locked in a mounting hole formed in the other one of said plates, and an umbrella-like elastic engagement portion extending from the outer periphery of a stem portion of said leg portion and to be in close area contact with said other plate, said leg portion having a projection formed on the outer periphery to engage with the edge of a mounting hole formed in said outer plate in a face-to-face relation to said engagement portion and a plurality of reduced-thickness axial hinge portions formed in a wall of said leg portion other than said projection, the wall of said leg portion being flexed in folding fashion about said hinge portions, one of said hinge portions being formed by an axial groove in the outer periphery, the other ones of said hinge portions being formed by axial grooves in the inner wall surface.

* * * * *